US011525884B2

(12) United States Patent
Lee

(10) Patent No.: US 11,525,884 B2
(45) Date of Patent: Dec. 13, 2022

(54) MULTI-SPECTRAL VEHICULAR RADAR SYSTEM

(71) Applicant: Toyota Motor Engineering & Manufacturing North America, Inc., Plano, TX (US)

(72) Inventor: Jae Seung Lee, Ann Arbor, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 319 days.

(21) Appl. No.: 16/896,308

(22) Filed: Jun. 9, 2020

(65) Prior Publication Data

US 2021/0382136 A1 Dec. 9, 2021

(51) Int. Cl.
*G01S 7/03* (2006.01)
*G01S 13/86* (2006.01)
*G01S 13/931* (2020.01)

(52) U.S. Cl.
CPC ............ *G01S 7/032* (2013.01); *G01S 13/865* (2013.01); *G01S 13/931* (2013.01); *G01S 2013/93271* (2020.01); *G01S 2013/93272* (2020.01)

(58) Field of Classification Search
CPC ...... G01S 7/032; G01S 13/865; G01S 13/931; G01S 2013/93271; G01S 2013/93272
See application file for complete search history.

(56) References Cited

U.S. PATENT DOCUMENTS

| 5,400,042 | A | * | 3/1995 | Tulintseff | ................. | H01Q 5/42 |
| | | | | | | 343/793 |
| 5,557,291 | A | * | 9/1996 | Chu | ..................... | H01Q 13/085 |
| | | | | | | 343/768 |
| 5,767,793 | A | * | 6/1998 | Agravante | ........... | H01Q 21/205 |
| | | | | | | 340/901 |
| 6,400,308 | B1 | * | 6/2002 | Bell | ...................... | G01S 13/931 |
| | | | | | | 340/901 |
| 7,042,420 | B2 | | 5/2006 | Ebling et al. | | |
| 7,358,497 | B1 | * | 4/2008 | Boreman | ............. | H01Q 21/064 |
| | | | | | | 250/332 |
| 7,489,280 | B2 | * | 2/2009 | Aminzadeh | .......... | H01Q 9/0407 |
| | | | | | | 343/846 |

(Continued)

OTHER PUBLICATIONS

Dominik, "Short Range Radar—Status of UWB Sensors and Their Applications," Proceedings of the 4th European Radar Conference, 2007, found at https://ieeexplore.ieee.org/abstract/document/4405498.

(Continued)

*Primary Examiner* — Peter M Bythrow
(74) *Attorney, Agent, or Firm* — Christopher G. Darrow; Darrow Mustafa PC

(57) ABSTRACT

Embodiments of a vehicular radar system are presented herein. One embodiment comprises a first circuitry layer including a first radar subsystem for a first frequency band, the first radar subsystem including a first end-fire antenna. The vehicular radar system also includes a second circuitry layer stacked on or under the first circuitry layer, the second circuitry layer including a second radar subsystem for a second frequency band, the second radar subsystem including a second end-fire antenna. In this embodiment, one or more components of the vehicular radar system are shared between the first and second radar subsystems.

8 Claims, 3 Drawing Sheets

(56) References Cited

U.S. PATENT DOCUMENTS

| | | | | |
|---|---|---|---|---|
| 7,728,772 | B2* | 6/2010 | Mortazawi | H01Q 21/0031 342/375 |
| 7,733,265 | B2* | 6/2010 | Margomenos | G01S 13/931 343/700 R |
| 7,830,301 | B2* | 11/2010 | Margomenos | H01Q 21/065 343/700 R |
| 8,022,861 | B2* | 9/2011 | Margomenos | H01Q 21/065 343/700 R |
| 8,305,259 | B2* | 11/2012 | Margomenos | G01S 13/86 343/700 R |
| 9,917,355 | B1* | 3/2018 | Lee | H01Q 21/20 |
| 10,020,590 | B2* | 7/2018 | Schmalenberg | G01S 13/931 |
| 10,141,636 | B2* | 11/2018 | Lee | H01Q 1/3283 |
| 10,205,457 | B1* | 2/2019 | Josefsberg | G01S 7/032 |
| 10,333,209 | B2* | 6/2019 | Schmalenberg | H01Q 1/3283 |
| 10,788,582 | B2* | 9/2020 | Feng | G01S 7/4818 |
| 11,024,953 | B2* | 6/2021 | Sato | G01S 7/02 |
| 2003/0112172 | A1* | 6/2003 | Shinoda | G01S 13/4463 342/149 |
| 2005/0248418 | A1* | 11/2005 | Govind | H03H 7/1775 331/179 |
| 2008/0074338 | A1* | 3/2008 | Vacanti | H01Q 21/28 343/705 |
| 2008/0169992 | A1* | 7/2008 | Ortiz | H01Q 21/065 343/700 MS |
| 2009/0058731 | A1* | 3/2009 | Geary | H01Q 5/378 343/700 MS |
| 2009/0102723 | A1* | 4/2009 | Mateychuk | H01Q 5/40 343/700 MS |
| 2009/0251356 | A1* | 10/2009 | Margomenos | H01Q 1/3233 342/70 |
| 2009/0251357 | A1* | 10/2009 | Margomenos | G01S 13/931 342/70 |
| 2009/0251362 | A1* | 10/2009 | Margomenos | G01S 13/931 342/175 |
| 2012/0007765 | A1* | 1/2012 | Margomenos | H01Q 21/065 342/175 |
| 2012/0194377 | A1* | 8/2012 | Yukumatsu | G01S 13/0209 342/368 |
| 2015/0346322 | A1* | 12/2015 | Schmalenberg | H01Q 13/206 342/175 |
| 2018/0026356 | A1* | 1/2018 | Schmalenberg | H01Q 1/3283 343/713 |
| 2018/0136327 | A1* | 5/2018 | Lee | G01S 13/931 |
| 2018/0246203 | A1* | 8/2018 | Lee | G01S 7/032 |
| 2020/0014086 | A1* | 1/2020 | Li | G01S 13/931 |
| 2020/0209358 | A1* | 7/2020 | Maleki | G01S 17/931 |
| 2021/0063566 | A1* | 3/2021 | Smith | G06V 20/58 |
| 2021/0125009 | A1* | 4/2021 | Lee | H04L 67/12 |
| 2021/0208272 | A1* | 7/2021 | Lavian | H03L 7/091 |
| 2022/0136186 | A1* | 5/2022 | Lierse | E01F 9/30 342/5 |

OTHER PUBLICATIONS

Jain et al., "A 24/77 GHz Dual-Band BiCMOS Frequency Synthesizer," IEEE 2008 Custom Integrated Circuits Conference (CICC), found at https://www.researchgate.net/profile/Payam_Heydari2/publication/224348434_A_2477GHz_dual-band_BiCMOS_frequency_synthesizer/links/0deec5347ce278d2b9000000.pdf.

Ghadiri et al., "A Dual-Band CMOS VCO for Automotive Radar Using a New Negative Resistance Circuitry," IEEE, 2010, found at http://www.ece.ualberta.ca/~kambiz/papers/C23.pdf.

Jain et al., "A Single-Chip Dual-Band 22-29-GHz/77-81-GHz BiCMOS Transceiver for Automotive Radars," IEEE Journal of Solid-State Circuits, vol. 44, No. 12, Dec. 2009, found at https://www.researchgate.net/profile/Payam_Heydari2/publication/224085198_A_single-chip_dual-band_22-29-GHz77-81-GHz_BiCMOS_transceiver_for_automotive_radars/links/0deec5347ce286f383000000.pdf.

Khraisat, "Simulation the Hybrid Combinations of 24GHz and 77GHz Automotive Radar," Applied Physics Research, vol. 4, No. 1, Feb. 2012, found at https://www.researchgate.net/profile/Yahya_Khraisat2/publication/268393187_Simulation_the_Hybrid_Combinations_of_24GHz_and_77GHz_Automotive_Radar/links/5530fc910cf2f2a588ab7eeb/Simulation-the-Hybrid-Combinations-of-24GHz-and-77GHz-Automotive-Radar.pdf.

Martinez, "Automotive Radar Systems: Status and Future Developments," bachelor's thesis, 2015-16, found at https://pdfs.semanticscholar.org/c086/ee4931528eead8bfb0552404013ab403e748.pdf.

Yi et al., "A Low Phase Noise 24/77 GHz Dual-Band Sub-Sampling PLL for Automotive Radar Applications in 65 nm CMOS Technology," 2013, found at https://www.ntu.edu.sg/home/eccboon/pub/24GHz77GHzPLL.pdf.

Yi et al., "A 24/77 GHz Dual-Band Receiver for Automotive Radar Applications," IEEE, 2019, found at http://wangcheng.mit.edu/sites/default/files/documents/IEEE_access_2019.pdf.

Wenger, "Automotive Radar—Status and Perspectives," CSIC 2005 Digest.

* cited by examiner

MULTI-SPECTRAL VEHICULAR RADAR SYSTEM

TECHNICAL FIELD

The subject matter described herein relates in general to vehicular radar systems and, more specifically, to multi-spectral vehicular radar systems.

BACKGROUND

Automotive radar systems support a variety of safety and convenience applications such as adaptive cruise control (ACC), parking assistance, collision warning, collision mitigation, blind spot detection, backup assistance, and assisted lane change. Traditionally, automotive radar systems have used a frequency band with a center frequency of 24 GHz. Systems using a frequency band with a center frequency of 77 GHz are becoming increasingly popular as they become more affordable. A 24-GHz system has advantages for short-range applications and penetrating dense fog, rain, snow, and other adverse-weather conditions. A 77-GHz system has advantages for long-range applications. Also, some objects reflect 24-GHz radar better than 77-GHz radar and vice versa. It is possible for an automotive radar system to use both frequency bands, but the design of such a dual-band system presents challenges, particularly the larger space such a system occupies compared to a single-band system.

SUMMARY

Embodiments of a vehicular radar system are presented herein. In one embodiment, a vehicular radar system comprises a first circuitry layer including a first radar subsystem for a first frequency band, the first radar subsystem including a first end-fire antenna. The vehicular radar system also includes a second circuitry layer stacked on or under the first circuitry layer, the second circuitry layer including a second radar subsystem for a second frequency band, the second radar subsystem including a second end-fire antenna. In this embodiment, one or more components of the vehicular radar system are shared between the first and second radar subsystems.

Another embodiment is a vehicle, comprising a vehicular radar system that includes a first circuitry layer including a first radar subsystem for a first frequency band, the first radar subsystem including a first end-fire antenna. The vehicular radar system also includes a second circuitry layer stacked on or under the first circuitry layer, the second circuitry layer including a second radar subsystem for a second frequency band, the second radar subsystem including a second end-fire antenna. In this embodiment, one or more components of the vehicular radar system are shared between the first and second radar subsystems. The vehicle also includes an Electronic Control Unit (ECU) connected with the vehicular radar system, the ECU determining characteristics of an object in an environment of the vehicle based on signals received from one or more of the first and second radar subsystems.

Another embodiment is a multi-spectral vehicular radar system, comprising a first circuitry layer including a first radar subsystem for a first frequency band having a center frequency of 24 GHz, the first radar subsystem including a first end-fire antenna. The multi-spectral vehicular radar system also includes a second circuitry layer stacked on or under the first circuitry layer, the second circuitry layer including a second radar subsystem for a second frequency band having a center frequency of 77 GHz, the second radar subsystem including a second end-fire antenna. In this embodiment, one or more components of the multi-spectral vehicular radar system are shared between the first and second radar subsystems.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
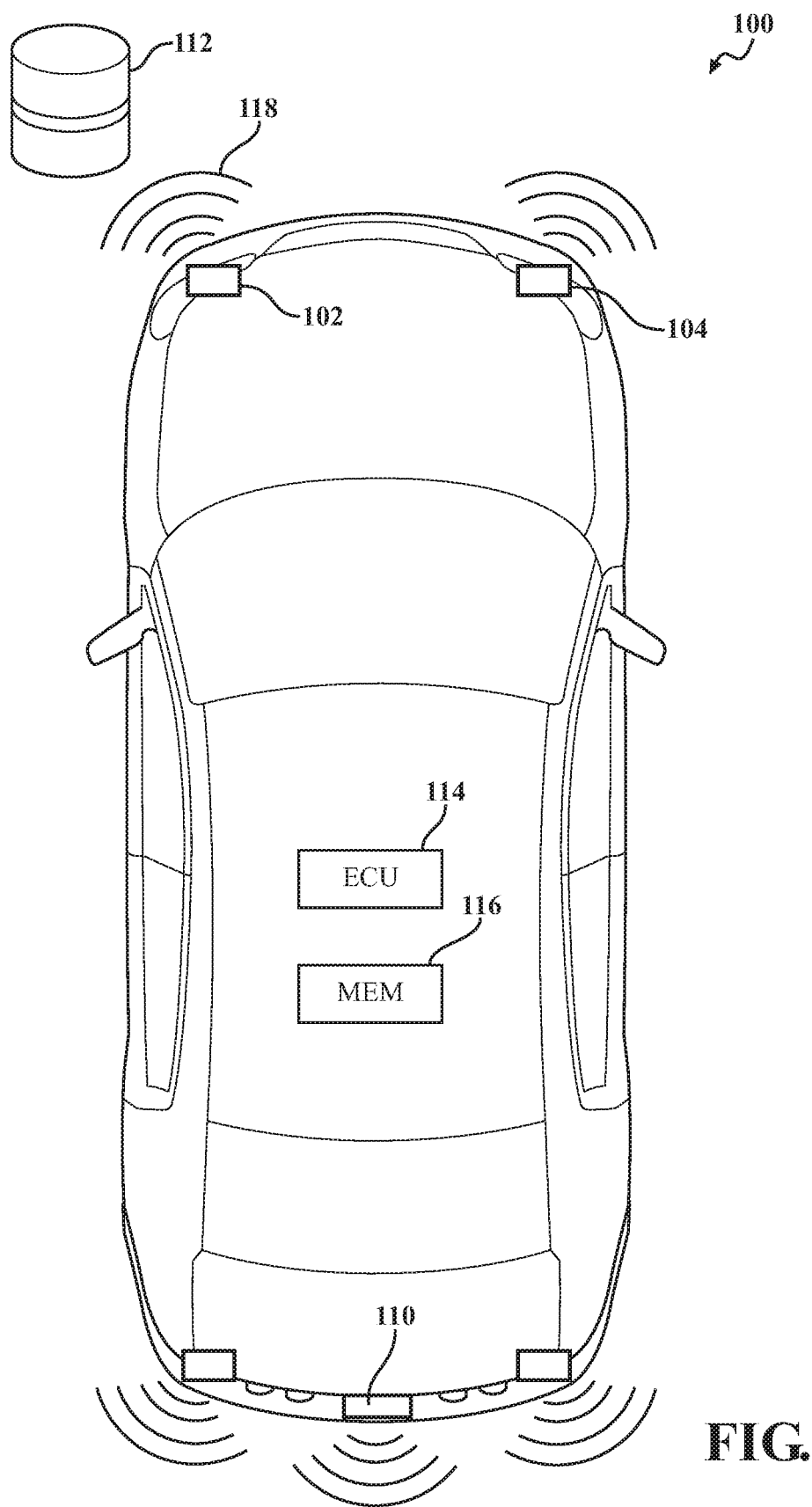
FIG. 1 illustrates a vehicle equipped with multiple vehicular radar systems for sensing objects in an environment of the vehicle, in accordance with an illustrative embodiment of the invention.

Conventional multi-spectral vehicular radar systems employing both 24- and 77-GHz frequency bands are implemented with a side-by-side topology, and they include patch (broadside) antennas. This results in a relatively large occupied volume and frontal surface area, making such a system less appealing for vehicular applications. In fact, such a radar system can impact the exterior design of the vehicle and can interfere with air flow to the radiator or heat exchanger, when the system is mounted on the front of the vehicle in the grille area.

Various embodiments disclosed herein provide a vehicular radar system comprising a first circuitry layer including a first radar subsystem for a first frequency band and a second circuitry layer including a second radar subsystem for a second frequency band. To overcome the shortcomings of conventional systems mentioned above, the second circuitry layer is stacked on or under the first circuitry layer, an end-fire antenna is employed in each of the first and second radar subsystems, and one or more components of the vehicular radar system are shared between the first and second radar subsystems. These techniques significantly reduce the occupied volume and frontal surface area compared with conventional systems.

In some embodiments, the first frequency band includes 24 GHz, and the second frequency band includes 77 GHz. For example, the center frequencies of the respective frequency bands can be 24 GHz and 77 GHz. In such an embodiment, the first radar subsystem (the 24-GHz subsystem) may be designed for measurements within a shorter range than the second radar subsystem (the 77 GHz subsystem). For example, in one embodiment, the 24-GHz subsystem is used for measurements in what is sometimes called short-range radar (SRR) and medium-range radar (MRR), and the 77-GHz subsystem is used for long-range radar (LRR) (and possibly also for MRR, depending on the embodiment). In some embodiments, the measurements of the two subsystems can overlap somewhat (e.g., both subsystems perform SRR and/or MRR measurements). In those embodiments, the overlapping measurements can be combined (e.g., via convolution). In one embodiment, the SRR has an associated range of approximately 0.15 to 30 m, the MRR has an associated range of approximately 1 to 100 m, and the LRR has an associated range of approximately 10 to 250 m.

In a different embodiment that has application to autonomous vehicles, in particular, the first and second frequency bands both include 77 GHz, but the respective end-fire antennas in the stacked radar subsystems are designed or configured for measurements within different distance ranges. For example, one radar subsystem can have an end-fire antenna with a wide field of view for shorter-range measurements, and the other radar subsystem can have an end-fire antenna with a narrow field of view for longer-range measurements.

In some embodiments, a chip-scale Light Detection and Ranging (LIDAR) unit can be added to the vehicular radar system. Also, in some embodiments, the first circuitry layer includes a first printed circuit board (PCB), and the second circuitry layer includes a second PCB. As discussed further below, each of the circuitry layers can include additional PCBs (e.g., for a power supply or a signal processing unit).

A vehicular radar system that includes two or more radar subsystems to support the same or two or more different frequency bands will sometimes be referred to herein as a "multi-spectral vehicular radar system" but will often be referred to simply as a "vehicular radar system." A vehicular radar system employing two different frequency bands is also sometimes called, by those skilled in the art, a "dual-band vehicular radar system."

As those skilled in the art are aware, the center frequency referred to herein as "77 GHz" is actually 76.5 GHz in the automotive radar industry, and it is common practice in the industry to round this figure to 77 GHz. Consequently, this description follows that convention.

Referring to FIG. 1, a vehicle 100 having radar sensing capabilities is shown. In some embodiments, vehicle 100 is an autonomous or semi-autonomous vehicle. The vehicle 100 includes a first vehicular radar system 102, a second vehicular radar system 104, a third vehicular radar system 106, a fourth vehicular radar system 108, and a fifth vehicular radar system 110. Each of the vehicular radar systems 102, 104, 106, 108, and 110 may detect data corresponding to characteristics of objects around the vehicle 100 such as the distance to the object, the size of the object, and/or the speed at which the object is moving. For example, the vehicular radar system 102 may transmit a signal or beam 118. The beam 118 may reflect from an object 112 and propagate toward the vehicular radar system 102. The vehicular radar system 102 may receive the reflected signal, and characteristics of the object 112 may be determined based on the received reflected signal.

The vehicle 100 may also include an electronic control unit (ECU) 114 and a memory 116. In some embodiments, the ECU 114 may include a logic device, such as a processor, FPGA, or the like, specifically designed to perform functions that correspond to operations of the vehicle 100. The memory 116 may include any non-transitory memory capable of storing data. For example, the memory 116 may store instructions to be performed by the ECU 114 and/or data usable by the ECU 114 to identify characteristics of objects based on radar signals received from one or more subsystems (e.g., for different frequency bands) of the vehicular radar systems 102, 104, 106, 108, and/or 110.

The ECU 114 may be coupled to each of the vehicular radar systems 102, 104, 106, 108, and 110, including any cameras positioned therein. The ECU 114 may receive radar data and image data corresponding to objects in the environment. The ECU 114 may determine the presence of and characteristics of an object, such as the object 112, based on the radar data. The ECU 114 may also determine characteristics of the object 112 based on the image data. The ECU 114 may verify the characteristics of the object 112 that were determined based on the radar data using the received image data. The ECU 114 may also supplement the characteristics of the object 112 that were determined based on the radar data using the received image data. For example, the ECU 114 may determine that the object 112 is 5 feet away from the vehicle 100 based on the radar data and may determine that the object 112 has a height of 3 feet based on the image data.

The embodiments of a multi-spectral vehicular radar system that are described in greater detail below can be mounted at any of the positions shown in FIG. 1 for vehicular radar systems 102, 104, 106, 108, or 110. The position of vehicular radar system 110 (front center, in the grille area) is of particular interest, in some embodiments. The compact size of the disclosed embodiments provides particular advantages at that position (e.g., avoiding interference with air flow to the radiator or heat exchanger).

In some embodiments, vehicle 100 is equipped with other sensors in addition to radar sensors and cameras. For example, in some embodiments, one or more of the vehicular radar systems 102, 104, 106, 108, and 110 include a chip-scale LIDAR unit (transmitter and receiver) in one of the stacked circuitry layers (e.g., the top layer). In some embodiments, vehicle 100 may also be equipped with one or more sonar sensors.

Figure 2:
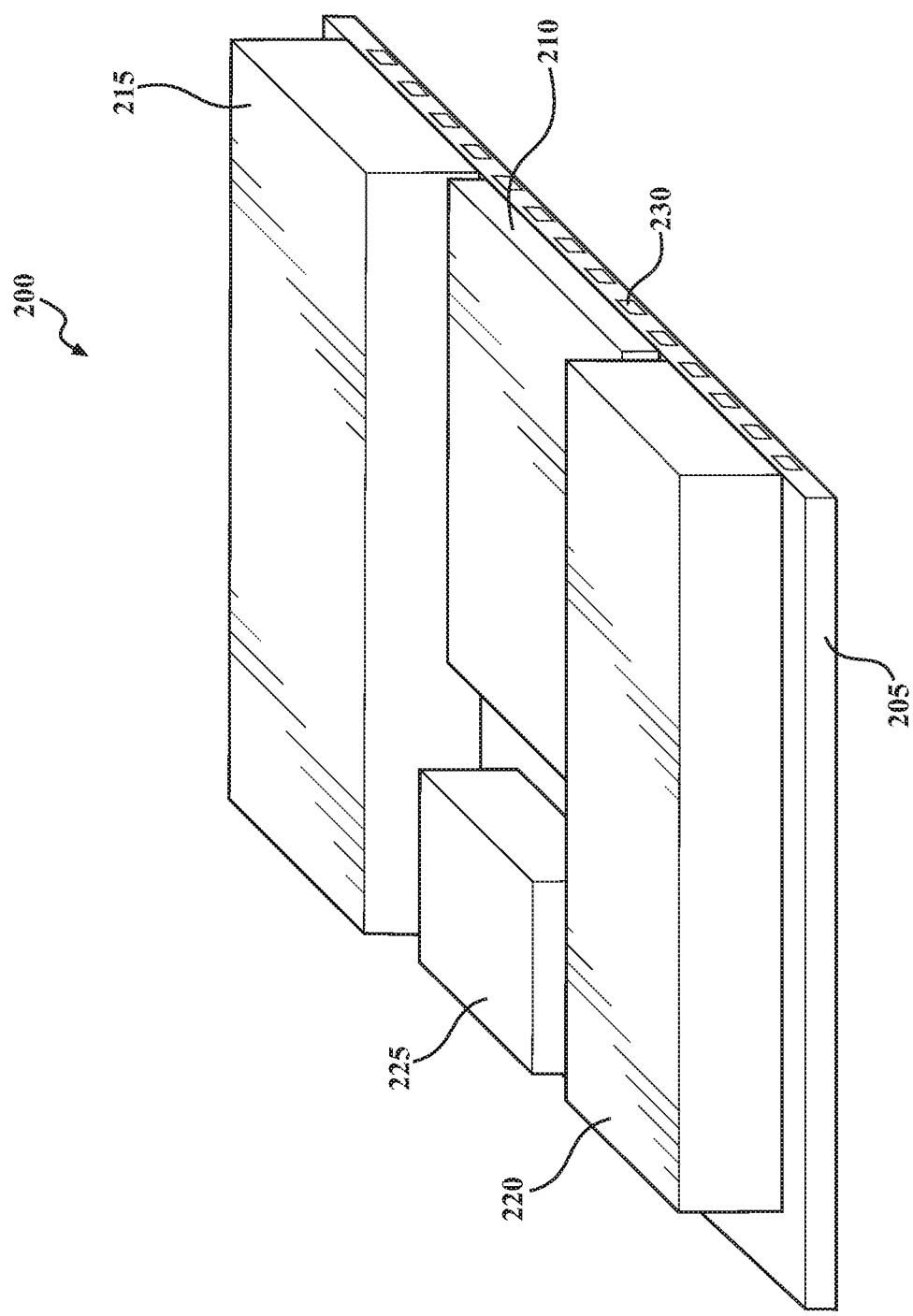
FIG. 2 is a perspective view of a vehicular radar system, in accordance with an illustrative embodiment of the invention.

FIG. 2 is a perspective view of a vehicular radar system 200, in accordance with an illustrative embodiment of the invention. As discussed above, vehicular radar system 200 can correspond to any of the vehicular radar systems 102, 104, 106, 108, or 110 shown in FIG. 1, depending on the embodiment. In FIG. 2, vehicular radar system 200 has a first circuitry layer that includes 24-GHZ radar subsystem 205. A second circuitry layer stacked on top of the first circuitry layer includes 77-GHz radar subsystem 210, power supply 215, signal processing unit and controller 220, and other electronics and connectors 225. In some embodiments, the first circuitry layer includes a first PCB, and the second circuitry layer includes a second PCB. As discussed further below, there can be additional PCBs within a given circuitry layer (e.g., a thin PCB for an end-fire antenna, a separate PCB for a power supply 215, a separate PCB for a signal processing unit and controller 220, etc.).

In some embodiments, the radar subsystems in the first and second circuitry layers share one or more components. Examples of shared components include, without limitation, a power supply, a signal processing unit, a local oscillator, a connector, a cooling subsystem, and a housing (not all of these components are individually labeled in FIG. 2). Depending on the particular embodiment, the shared components can be in the first circuitry layer (the bottom layer in FIG. 2), the second circuitry layer (the top layer in FIG. 2), or the shared components can be split between the first and second circuitry layers.

In some embodiments, other electronics and connectors 225 includes interface circuitry for interfacing with a vehicle 100. The other electronics and connectors 225 can also include circuitry to support communication protocols between vehicular radar system 200 and the vehicle 100 (e.g., between the vehicular radar system 200 and ECU 114).

In the embodiment of FIG. 2, each radar subsystem (205 and 210) includes an end-fire antenna (see the ends of the traces of 24-GHz end-fire antenna 230 in FIG. 2). For clarity, the end-fire antenna for 77-GHz radar subsystem 210 is not shown in FIG. 2. It can be similar in design to 24-GHz end-fire antenna 230, except that it is scaled down in size. In one embodiment, the end-fire antenna for 77-GHz radar subsystem 210 is on a thin PCB that is situated on top of the 77-GHz radar subsystem 210. Thus, the end-fire antenna for the 77-GHz band, like the rest of 77-GHz radar subsystem 210, is part of the second (top) circuitry layer of vehicular radar system 200, in this embodiment. Further details regarding the end-fire antennas for the two respective radar subsystems are discussed below in connection with FIG. 3. In the embodiment of FIG. 2, the modulation used for both the 24-GHz and 77-GHz frequency bands is Frequency-Modulated Continuous Wave (FMCW).

As discussed above, in some embodiments, the first radar subsystem (the 24-GHz subsystem in the embodiment of FIG. 2) is designed for measurements within a shorter range than the second radar subsystem (the 77 GHz subsystem, in the embodiment of FIG. 2). For example, in one embodiment, the 24-GHz subsystem is used for SRR and, in some embodiments, MRR measurements, and the 77-GHz subsystem is used for LRR measurements and, in some embodiments, MRR measurements. In some embodiments, the SRR and/or MRR measurements of the two radar subsystems can be combined (e.g., through convolution). To generalize, one of the radar subsystems can be designed for measurements within a first distance range, and the other radar subsystem can be designed for measurements within a second distance range, the second distance range including longer distances than the first distance range or vice versa.

As mentioned above, in a different embodiment with application to autonomous vehicles, in particular, the first and second frequency bands both include 77 GHz (e.g., 77 GHz is the center frequency of both frequency bands), but the respective end-fire antennas in the stacked radar subsystems are designed for measurements within different distance ranges. For example, one radar subsystem can have an end-fire antenna with a wide field of view for shorter-range measurements (e.g., SRR), and the other radar subsystem can have an end-fire antenna with a narrow field of view for longer-range measurements (e.g., MRR and LRR). To generalize, in this kind of embodiment, the end-fire antenna of one of the radar subsystems can be designed for measurements within a first distance range, and the end-fire antenna for the other radar subsystem can be designed for measurements within a second distance range, the first distance range including longer distances than the second distance range or vice versa.

In some embodiments, the second circuitry layer (the top layer in the embodiment of FIG. 2) includes a chip-scale LIDAR unit (transmitter and receiver) (not shown in FIG. 2). In those embodiments, the LIDAR unit can occupy a portion of the second circuitry layer adjacent to the front edge of the system—the edge where the end-fire antennas transmit and receive RF (radar) energy. This is the edge along which the ends of the traces of the 24-GHz end-fire antenna 230 are depicted in FIG. 2.

Though FIG. 2 depicts the second (top) circuitry layer as housing the 77-GHz radar subsystem 210, the "top" and "bottom" positions of the circuitry layers are arbitrary. For example, the entire vehicular radar system 200 depicted in FIG. 2 could be inverted, which would place the 24-GHZ radar subsystem 205 above the 77-GHz radar subsystem 210. Also, the designation of "first" and "second" circuitry layers, "first" and "second" radar subsystems, and "first" and "second" frequency bands is also arbitrary because those labels can be interchanged without affecting the design or operation of vehicular radar system 200.

Figure 3:
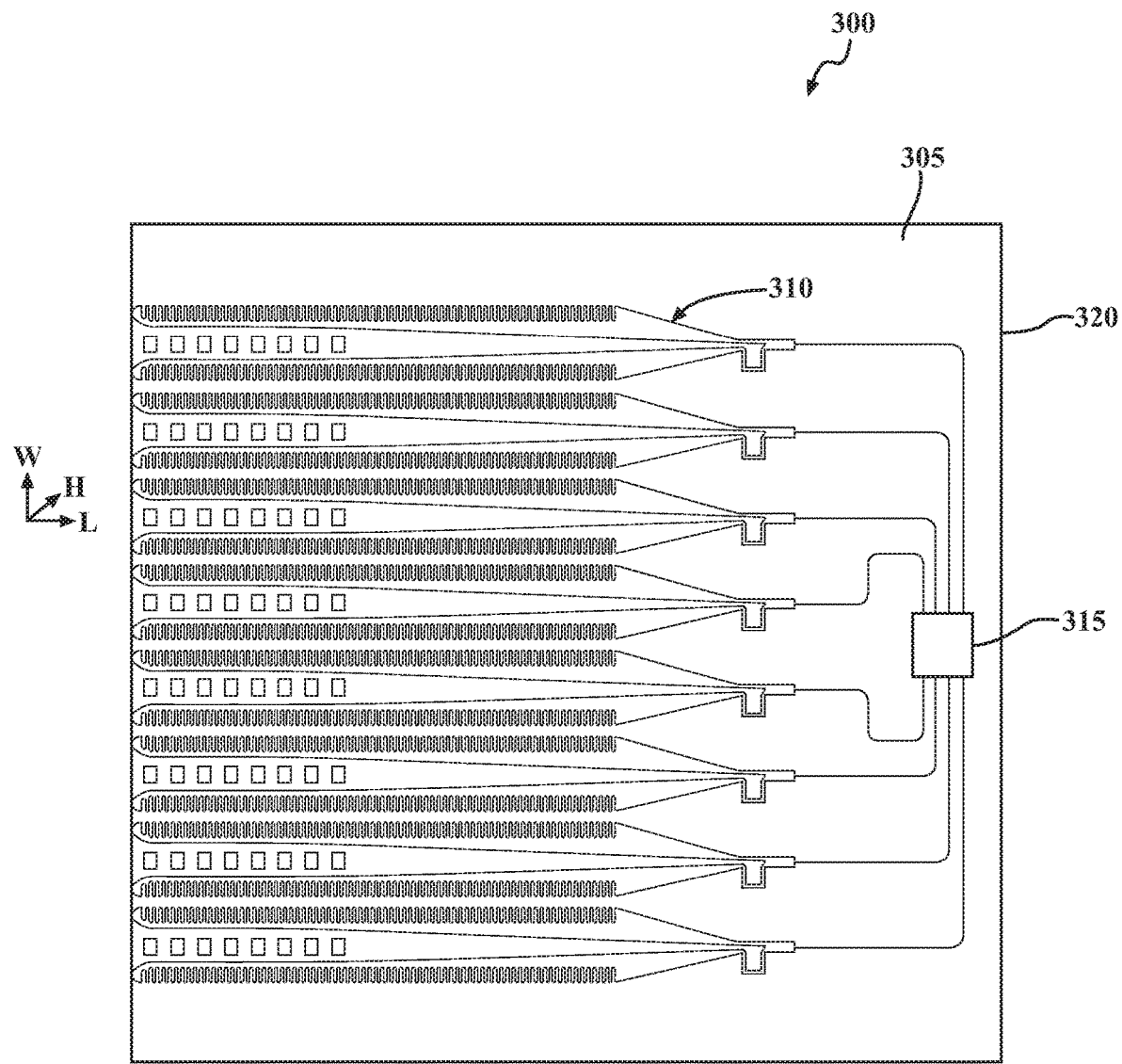
FIG. 3 illustrates an end-fire antenna assembly, in accordance with an illustrative embodiment of the invention.

FIG. 3 illustrates an end-fire antenna assembly 300, in accordance with an illustrative embodiment of the invention. As mentioned above, in the embodiment illustrated in FIG. 2, the end-fire antenna 230 for the 24-GHz subsystem 205 and the end-fire antenna for the 77-GHz radar subsystem 210 (not shown in FIG. 2) are similar in design, but they are scaled in size in accordance with the respective wavelengths of the two different frequency bands. FIG. 3 thus represents the receive portion of either end-fire antenna. The transmit portion of the end-fire antenna is not shown in FIG. 3. In the embodiment shown in FIG. 3, end-fire antenna assembly 300 includes a PCB 305, a plurality of antenna traces 310, a radio-frequency integrated circuit (RFIC) 315, and a chip-connection end 320. In FIG. 3, radar signals reflected from an object travel in the positive L direction to reach the ends of the traces 310 of the end-fire antenna's receive portion. The transmit portion of the end-fire antenna (not shown in FIG. 3) emits radar signals (an electromagnetic field or "EMF") in the longitudinal direction (i.e., in the negative L direction) or toward the left in FIG. 3.

The principles underlying the embodiments described above can be extended to multi-spectral vehicular radar systems that have more than two frequency bands. For example, in a three-band system, there can be three vertically stacked circuitry layers, one for each of three radar subsystems, each radar subsystem corresponding to one of the three supported frequency bands and each radar subsystem having an end-fire antenna for the applicable frequency band. In such an embodiment, the three frequency bands could all be distinct, or there could be an embodiment in which one radar subsystem corresponds to 24 GHz and the other two radar subsystems both correspond to 77 GHz, the end-fire antennas of the two 77-GHz radar subsystems being configured for different fields of view for different distance ranges, as discussed above.

Though the embodiments described above have focused on center frequencies of 24 GHz and 77 GHz, the center frequencies can be different from those values, in other embodiments. Also, the specific bandwidths of the radar frequency bands can vary, depending on the particular embodiment.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-3, but the embodiments are not limited to the illustrated structure or application.

The components described above can be realized in hardware or a combination of hardware and software and can be realized in a centralized fashion in one processing system or in a distributed fashion where different elements are spread across several interconnected processing systems. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

As used herein, "cause" or "causing" means to make, command, instruct, and/or enable an event or action to occur or at least be in a state where such event or action may occur, either in a direct or indirect manner.

Aspects herein can be embodied in other forms without departing from the spirit or essential attributes thereof. Accordingly, reference should be made to the following claims rather than to the foregoing specification, as indicating the scope hereof.

What is claimed is:

1. A vehicular radar system, comprising:
   a first circuitry layer including a first radar subsystem for a first frequency band, the first radar subsystem including a first end-fire antenna;
   a second circuitry layer including a second radar subsystem for a second frequency band, the second radar subsystem including a second end-fire antenna; and
   a third circuitry layer including a third radar subsystem for a third frequency band, the third radar subsystem including a third end-fire antenna;
   wherein the first, second, and third circuitry layers are stacked vertically on top of one another and the first, second, and third frequency bands include at least two different frequency bands.

2. The vehicular radar system of claim 1, wherein the first, second, and third frequency bands are distinct from one another.

3. The vehicular radar system of claim 1, wherein:
   one of the first, second, and third frequency bands includes 24 GHz;
   the remaining two frequency bands of the first, second, and third frequency bands both include 77 GHz; and
   the respective end-fire antennas of the radar subsystems for the remaining two frequency bands are configured for different distance ranges.

4. The vehicular radar system of claim 1, wherein at least one of the first, second, and third circuitry layers includes a chip-scale Light Detection and Ranging (LIDAR) unit.

5. A vehicle, comprising:
   a vehicular radar system that includes:
      a first circuitry layer including a first radar subsystem for a first frequency band, the first radar subsystem including a first end-fire antenna;
      a second circuitry layer including a second radar subsystem for a second frequency band, the second radar subsystem including a second end-fire antenna; and a third circuitry layer including a third radar subsystem for a third frequency band, the third radar subsystem including a third end-fire antenna;
wherein the first, second, and third circuitry layers are stacked vertically on top of one another and the first, second, and third frequency bands include at least two different frequency bands; and an Electronic Control Unit (ECU) connected with the vehicular radar system, the ECU determining characteristics of an object in an environment of the vehicle based on signals received from one or more of the first, second, and third radar subsystems.

6. The vehicle of claim 5, wherein the first, second, and third frequency bands are distinct from one another.

7. The vehicle of claim 5, wherein:
one of the first, second, and third frequency bands includes 24 GHz;
the remaining two frequency bands of the first, second, and third frequency bands both include 77 GHz; and
the respective end-fire antennas of the radar subsystems for the remaining two frequency bands are configured for different distance ranges.

8. The vehicle of claim 5, wherein at least one of the first, second, and third circuitry layers includes a chip-scale Light Detection and Ranging (LIDAR) unit.

* * * * *